United States Patent
Hsu et al.

(10) Patent No.: US 11,625,837 B2
(45) Date of Patent: Apr. 11, 2023

(54) EARTHQUAKE MONITORING SYSTEM AND EARTHQUAKE MONITORING METHOD

(71) Applicant: National Taiwan University of Science and Technology, Taipei (TW)

(72) Inventors: Ting-Yu Hsu, New Taipei (TW); Xiang-Ju Kuo, New Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 144 days.

(21) Appl. No.: 17/184,616

(22) Filed: Feb. 25, 2021

(65) Prior Publication Data

US 2022/0044420 A1    Feb. 10, 2022

(30) Foreign Application Priority Data

Aug. 10, 2020  (TW) ................................. 109127130

(51) Int. Cl.
*G06T 7/246* (2017.01)
*G08B 21/10* (2006.01)
(Continued)

(52) U.S. Cl.
CPC .............. *G06T 7/246* (2017.01); *G06T 3/60* (2013.01); *G06T 7/215* (2017.01); *G06T 7/74* (2017.01);
(Continued)

(58) Field of Classification Search
CPC .......... G06T 7/246; G06T 7/215; G06T 7/74; G06T 3/60; G06T 2207/20081;
(Continued)

(56) References Cited

U.S. PATENT DOCUMENTS 5,657,003 A * 8/1997 Fuentes ................. G01B 11/16
  348/130
6,647,161 B1 * 11/2003 Hodge ................ G01M 5/0008
  385/12

(Continued)

FOREIGN PATENT DOCUMENTS

CN        105403143 A       3/2016
CN        109035343 A   *  12/2018
(Continued)

OTHER PUBLICATIONS

Yann LeCun et al., "Convolutional Networks and Applications in Vision." In Proceedings of the 2010 IEEE International Symposium on Circuits and Systems (ISCAS), May 30-Jun. 2, 2010, pp. 253-256.

(Continued)

*Primary Examiner* — Ian L Lemieux
(74) *Attorney, Agent, or Firm* — CKC & Partners Co., LLC

(57) ABSTRACT

An earthquake monitoring system includes a first monitor and a computer system. The first monitor is configured to photograph at least one reference point disposed on a first floor slab of a building to generate a first initial image and a first image stream. The first monitor is disposed on a second floor slab of the building. The computer system is configured to process the first initial image and the first image stream, to obtain a first interlayer relative displacement vector between the first floor and the second floor according to the first image stream and a rotation angle of the first monitor, and output a warning signal according to the first interlayer relative displacement vector.

13 Claims, 5 Drawing Sheets

(51) Int. Cl.
  *G06T 7/73* (2017.01)
  *G06T 3/60* (2006.01)
  *G06T 7/215* (2017.01)
(52) U.S. Cl.
  CPC .... *G08B 21/10* (2013.01); *G06T 2207/20081* (2013.01); *G06T 2207/20084* (2013.01); *G06T 2207/30232* (2013.01)
(58) Field of Classification Search
  CPC .......... G06T 2207/20084; G06T 2207/30232; G08B 21/10
  See application file for complete search history.

(56) References Cited

U.S. PATENT DOCUMENTS

| | | | |
|---|---|---|---|
| 2011/0044509 A1* | 2/2011 | Huang | G06T 7/001 382/107 |
| 2013/0142386 A1 | 6/2013 | Florian et al. | |
| 2013/0155223 A1* | 6/2013 | Jaw | G08B 13/181 348/135 |
| 2013/0208997 A1 | 8/2013 | Liu et al. | |
| 2014/0316708 A1* | 10/2014 | Mollineaux | G01M 5/0066 702/15 |
| 2016/0054460 A1* | 2/2016 | Jackson | G01V 1/008 342/357.51 |
| 2016/0171309 A1* | 6/2016 | Hay | A61B 5/0077 348/143 |
| 2020/0003918 A1* | 1/2020 | Vancho | G08B 21/10 |
| 2020/0326187 A1* | 10/2020 | Ohhashi | G01C 11/06 |

FOREIGN PATENT DOCUMENTS

| | | | | |
|---|---|---|---|---|
| CN | 109084698 A | * | 12/2018 | |
| CN | 110176064 A | | 8/2019 | |
| CN | 110281247 A | | 9/2019 | |
| CN | 111272366 A | * | 6/2020 | .......... G01M 5/0008 |
| TW | 201235637 A1 | | 9/2012 | |
| TW | 201544788 A | | 12/2015 | |
| TW | 201715476 A | | 5/2017 | |
| TW | 202001814 A | | 1/2020 | |
| TW | I730859 B | | 6/2021 | |
| WO | WO-2021056630 A1 | * | 4/2021 | .......... G01N 21/8851 |

OTHER PUBLICATIONS

Trapani, D et al., "Uncertainty evaluation of after-earthquake damage detection strategy." In Proceedings of the 2015 IEEE Workshop on Environmental, Energy, and Structural Monitoring Systems (EESMS), Trento, Jul. 9-10, 2015; pp. 125-130.

Ting-Yu Hsu et al., "PDP method to compensate or rotational effect when using a single surveillance camera for interstory drift measurement" Measurement Science and Technology, Jun. 16, 2020.

Ting-Yu Hsu et al., "A Standard-Alone Smart Camera System for Online Post-Earthquake Building Safety Assessment" Sensors, Jun. 15, 2020.

* cited by examiner

EARTHQUAKE MONITORING SYSTEM AND EARTHQUAKE MONITORING METHOD

CROSS-REFERENCE TO RELATED APPLICATION

This application claims priority to Taiwan Application Serial Number 109127130, filed Aug. 10, 2020, which is herein incorporated by reference in its entirety.

BACKGROUND

Field of Invention

The present invention relates to an earthquake monitoring system. More particularly, the present invention relates to the earthquake monitoring system that uses a monitor to measure degree of damage of a building.

Description of Related Art

Taiwan is located at the junction of the Philippine Sea Plate and the Eurasian Plate, and the Philippine Sea Plate collides with the Eurasian Plate toward the northwest every year, so it causes frequent earthquakes. Earthquakes often bring many accidental damages to buildings and serious threats to people's lives. For example, the Chichi earthquake caused many buildings to collapse and deform, and caused many people died.

To avoid any damage to people, residences and other buildings caused by earthquakes, the best way is to be alert to earthquakes, to evacuate first when a small earthquake occurs, or to check the degree of damage of the building and repair it after the earthquake, so as to prevent the safety of the building from gradually decreasing.

SUMMARY

In order to solve the above problems, one aspect of the present disclosure is provided an earthquake monitoring system, which comprises a first monitor and a computer system. The first monitor is configured to photograph at least one reference point disposed on a first floor slab of a building to generate a first initial image and a first image stream, wherein the first monitor is disposed on a second floor slab of the building; and the computer system is configured to process the first initial image and the first image stream to obtain a first interlayer relative displacement vector between the first floor and the second floor, and control a warning system to output a warning signal according to the first interlayer relative displacement vector.

Another aspect of the present disclosure is provided an earthquake monitoring method, which comprises: photographing, by a first monitor, at least one reference point disposed on a first floor slab of a building to generate a first initial image and a first image stream; processing, by a computer system, the first initial image and the first image stream to obtain a first interlayer relative displacement vector between the first floor and a second floor; and controlling a warning system to output a warning signal according to the first interlayer relative displacement vector.

Another aspect of the present disclosure is provided a computer system for earthquake monitoring, which comprises an image collector and a computing module. The image collector is configured to receive a first initial image and a first image stream from a first monitor, wherein the first monitor is disposed on a second floor slab of a building and photographs at least one reference point disposed on a first floor slab of the building to generate the first initial image and the first image stream; and the computing module is connected to the image collector and the output module, and configured to process the first initial image and the first image stream to obtain a first interlayer relative displacement vector between the first floor slab and the second floor slab, and control, by an output module, a warning system to output a warning signal according to the first interlayer relative displacement vector.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the present disclosure, examples of which are illustrated in the accompanying drawings. However, the embodiments provided herein are intended as illustrative only since numerous modifications and variations therein will be apparent to those skilled in the art. Description of the operation does not intend to limit the operation sequence. Any structures resulting from recombination of components with equivalent effects are within the scope of the present disclosure. In addition, the drawings are for illustrative purposes only, and are not drawn according to the original dimensions. To facilitate understanding, the same elements in the following description will be described with the same symbols.

Unless otherwise specified, the terms used in the entire specification and the claims usually have the usual meaning of each word used in this field, in the content of the present disclosure, and in the special content. Some terms used to describe the present disclosure can be discussed below or elsewhere in this specification to provide those skilled in the art with additional guidance on the description of the present disclosure.

The terms "around," "about" or "approximately" shall generally mean within 20 percent, preferably within 10 percent, and more preferably within 5 percent of a given value or range. If there is no clear description in the text, numerical quantities given herein are approximate, and the values mentioned are regarded as approximate values, for example, the error or range expressed as the term "around," "about" or "approximately", or other approximate values.

Regarding the "first", "second", etc. used in this article, It does not specifically refer to the meaning of order or sequence, nor is it used to limit the present disclosure. It is only for distinguishing elements or operations described in the same technical terms.

Secondly, the terms "comprise", "include", "have", "contain", etc. used in this article are all open terms, meaning including but not limited to.

In addition, regarding the "couple" or "connect" used in this article, it can mean that two or more elements make physical or electrical contact with each other directly, or make physical or electrical contact with each other indirectly, and it can also mean that two or more elements are in mutual operation or action.

Figure 1:
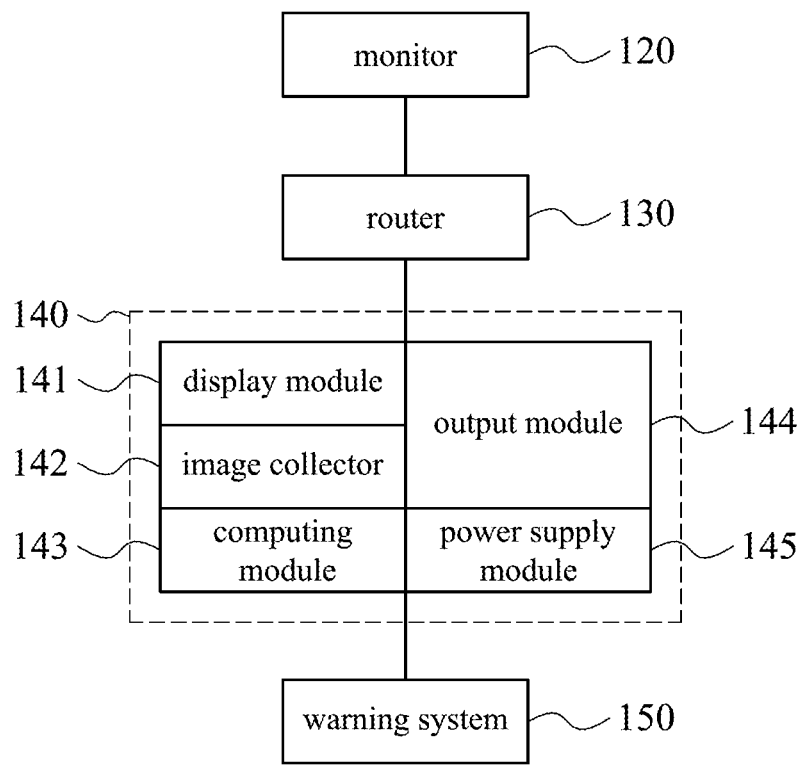
FIG. 1 is a functional block diagram of an earthquake monitoring system 100 according to some embodiments of the present disclosure.

Referring to FIG. 1, FIG. 1 is a functional block diagram of an earthquake monitoring system 100 according to some embodiments of the present disclosure. In one embodiment, the earthquake monitoring system 100 includes a monitor 120, a router 130, a computer system 140, and a warning system 150. The monitor 120 is configured to extract continuous images of the reference point. The router 130 is connected to the monitor 120 and configured to receive the signal from the monitor 120. The computer system 140 is connected to the router 130 and the warning system 150, and is configured to receive the signal from the router 130. If the computer system 140 determines that the value (e.g. the degree of damage described later) in the signal is higher than the threshold value, the computer system 140 can control the warning system 150 to transmit a warning signal. The warning system 150 can transmit the warning signal to relevant personnel.

In some embodiments, the monitor 120 is disposed on a first floor of a building. In some embodiments, the monitor 120 includes an anti-theft monitor, a camera that can collect a series of images, a camera that controls the flow of people in the building, or a camera that can photograph continuously. The above-mentioned implementation of the monitor 120 is only an example, and is not limited thereto. Any device that can extract continuous images is within the protection scope of the present disclosure.

In FIG. 1, the monitor 120 is configured to extract an initial image and a continuous image stream, where the initial image is the image extracted by the monitor 120 before the earthquake occurred, and the continuous image stream is the multiple photos continuously extracted during the earthquake. Next, the initial image and the image extracted by the monitor 120 at each time point are transmitted to the router 130. The router 130 is further connected to the computer system 140 through a network cable, and the computer system 140 is connected to the warning system 150. In one embodiment, the computer system 140 receives information (i.e. information including the initial image and the image, etc. extracted by the monitor 120) from the router 130. The computer system 140 calculates the relative displacement ratio of the adjacent floor slabs in the horizontal direction according to the above-mentioned information, and then determines whether to transmit the warning signal to the warning system 150 to notify the relevant personnel according to the relative displacement ratio of the adjacent floor slabs in the horizontal direction.

In some embodiments, the computer system 140 includes a display module 141, an image collector 142, a computing module 143, an output module 144, and a power supply module 145. The display module 141 is configured to display the received images and the signal. In some embodiments, the display module 141 can be implemented by a screen or various other electronic devices that can display images. The image collector 142 is configured to collect the received images for the computing module 143 to use. In some embodiments, the image collector 142 can be implemented by a recorder or various other electronic devices that can collect images.

The computing module 143 is configured to calculate the relative displacement ratio of the adjacent floor slabs in the horizontal direction according to the received signal from the router 130. Next, the computing module 143 determines the degree of damage to the building according to the relative displacement ratio of the adjacent floor slabs in the horizontal direction. When the degree of damage is higher than the threshold value, the output module 144 outputs the warning signal to the warning system 150. The power supply module 145 is configured to provide electrical energy for the computer system 140 to use.

In some embodiments, the computing module 143 can be implemented by a processor or various other electronic devices capable of computing. In some embodiments, the output module 144 can be implemented by a general-purpose input output (GPIO) interface or various other devices or transmission interfaces that can be configured to transmit data to an external system. In some embodiments, the power supply module 145 can be implemented by a power converter or various other electronic devices that can supply power to the computer system.

The above-mentioned implementation of the computer system 140 is only an example. Various implementations that can perform the same operations as the computer system 140 are all within the scope of the present disclosure.

In one embodiment, the warning system 150 includes one or more warning units (not shown) and a memory unit (not shown). In some embodiments, the memory unit stores a preset warning signal (e.g. a warning ringtone), and the warning unit (e.g. a loudspeaker) is configured to play the warning signal. When the warning signal of the computer system 140 is transmitted to the warning system 150, the warning system 150 broadcasts the warning ringtone to each floor of the building through one or more loudspeakers, so as to quickly notify all personnel to evacuate. In one embodiment, the warning system 150 includes a communication system (not shown). The communication system is configured to transmit a text message or transmit a voice signal to notify the relevant personnel when a warning signal from the computer system 140 is received. The relevant personnel can be personnel of hospitals, fire brigades, security and building safety assessment. When the damage to the building is serious, the personnel of the hospitals and fire brigades can know the damage of the building through the above-mentioned text message or voice signal, and identify the number of ambulances or fire engines to be dispatched and the degree of urgency to increase the efficiency of rescue assistance based on these. When the damage of the building is relatively minor, the personnel of building safety assessment can know the damage of the building through the above-mentioned text message or voice signal to evaluate the urgency of repairing the building or the corresponding measures that must be taken when there is no obvious damage to the building.

Figure 2A:
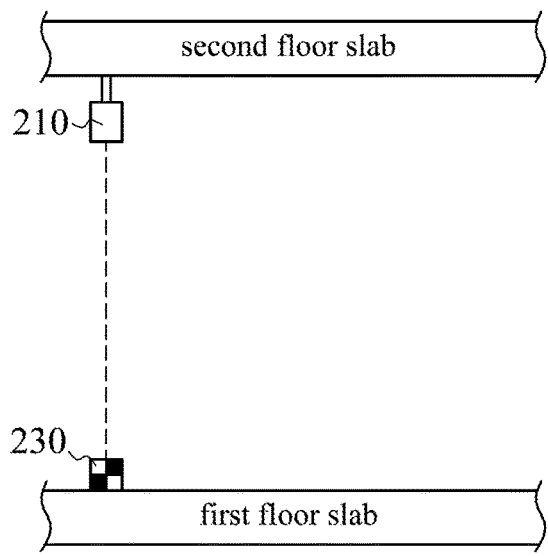
FIG. 2A is a schematic diagram of the configuration of the monitor of the earthquake monitoring system in FIG. 1 under normal conditions according to some embodiments of the present disclosure.

Referring to FIG. 2A, FIG. 2A is a schematic diagram of the configuration of the monitor of the earthquake monitoring system in FIG. 1 under normal conditions according to some embodiments of the present disclosure. In FIG. 2A, a monitor group 210 is shown. Although there is only one set of monitors in this embodiment, the present disclosure is not limited to this, and any number of monitors are within the scope of the present disclosure.

In some embodiments, the monitor group 210 is disposed on the second floor slab (e.g. on the ceiling of the first floor) and spaced apart from each other, and the reference point 230 is located on the first floor slab (e.g. on the floor of the first floor). In some embodiments, the monitoring range of the monitor group 210 is sufficient to cover the position where the reference point 230 can shift during the earthquake. As shown in FIG. 2A, the position marked by the reference point 230 is the initial position before the earthquake. In the present disclosure, the reference point 230 can also be referred to as a feature point in some embodiments.

In some embodiments, the monitor (e.g. the monitor group 210) is disposed above the ceiling of the first floor of the building, and the reason is that the first floor of a building nowadays usually has a monitor for monitoring the safety of the people in the building. Therefore, the monitor group 210 can be directly implemented by existing monitors without additional configuration. In addition, since the first floor is the most vulnerable floor of a general building, monitoring the phenomenon that occurs on the first floor during an earthquake can best represent the largest damage to the entire building due to the earthquake. In short, by the above-mentioned arrangement, the cost of the earthquake monitoring system 100 can be reduced, and the accuracy of identifying the degree of damage can also be increased. However, the positions of the above-mentioned monitor and the reference point are not limited to the above embodiments, that is, in different embodiments, the reference point can be disposed on the ceiling and the monitor is disposed on the floor.

As shown in FIG. 2A, the distance between the monitor group 210 and the reference point 230 can be inferred from the size of the reference point 230 in the monitored image. In some embodiments, the reference point 230 can be an object originally fixed on the first floor of the building, thereby eliminating the additional cost of setting the reference point. For example, the reference point 230 includes a post box, a fire hydrant or a guard room, a corner of a wall, a corner of a pole, or other similar locations or targets, but is not limited thereto. Any other objects that will not be displaced relative to the floor slab due to the earthquake are within the scope of the present disclosure.

Figure 2B:
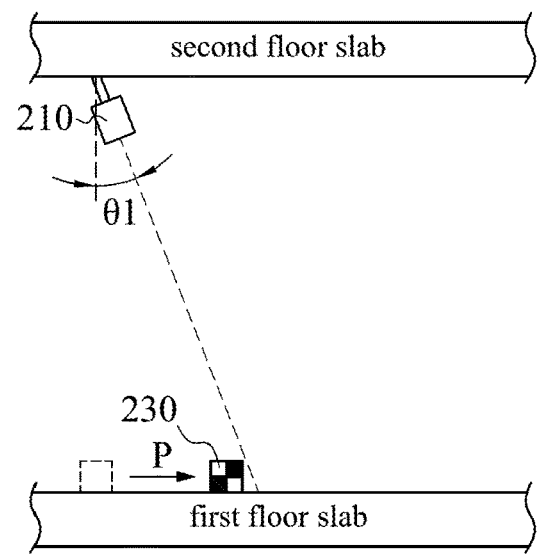
FIG. 2B is a schematic diagram of the configuration of the monitor of the earthquake monitoring system in FIG. 1 at a time point t during the occurrence of an earthquake according to some embodiments of the present disclosure.

Referring to FIG. 2B, FIG. 2B is a schematic diagram of the configuration of the monitor of the earthquake monitoring system in FIG. 1 at a time point t during the occurrence of an earthquake according to some embodiments of the present disclosure. In this embodiment, the monitor group 210 is rotated by the angle θ1 at time point t, and the position of the reference point 230 is shifted to the right relative to the second floor slab due to the earthquake.

In some embodiments, in addition to the above-mentioned reference point 230, at least two reference points (not shown) are also disposed between the first floor slab and the second floor slab (e.g. on the wall), and the rotation angle θ1 of the monitor group 210 can be identified according to two reference points between the floor slabs. For example, the images extracted by the monitor group 210 relative to the two reference points between the floor slabs are different after the monitor group 210 is rotated. Therefore, the rotation angle θ1 of the monitor group 210 can be identified according to different image content. In other embodiments, two reference points (not shown) disposed between the first floor slab and the second floor slab (e.g. on the wall) can also be configured to use pure image processing to remove the displacement measurement error caused by the rotation of the monitor group 210. The details can be described in detail below in conjunction with the embodiment described in FIG. 4.

Figure 2C:
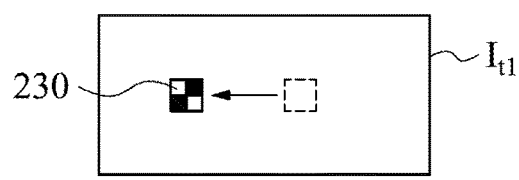
FIG. 2C is a schematic diagram of an image extracted by the monitor group in FIG. 2B according to some embodiments of the present disclosure.

Referring to FIG. 2C, FIG. 2C is a schematic diagram of an image extracted by the monitor group 210 in FIG. 2B according to some embodiments of the present disclosure. In FIG. 2C, the dashed square is the initial position of the reference point 230, and the image It1 is the image extracted by the monitor group 210 at time point t. The causes of the offset path of the reference point 230 shown in the image It1 include the relative displacement P between the first floor slab and the second floor slab and the rotation of the monitor group 210 due to the earthquake. In some embodiments, in order to estimate the relative displacement P, the displacement corresponding to the rotation of the monitor group 210 due to the earthquake can be subtracted from the distance of the offset path to obtain the relative displacement P of the reference point 230. Any algorithm that can know the relative displacement is within the protection scope of the present disclosure.

For the sake of convenience and clarity, the following methods of earthquake monitoring are described with reference to the earthquake monitoring system 100 shown in FIG. 1 and FIGS. 2A-2C, but are not limited to them.

First, the extracted image is calibrated. In this step, the monitor group 210 transmits the extracted photo back to the computer system 140, and the computer system 140 calibrates the obtained photo. In some embodiments, the known calibration points are extracted by the monitor group 210 first. The area (the area including the reference point 230) of one 9×9 checkerboard calibration board to be tracked is disposed first, and the training photo is photographed. Therefore, the training photo is converted into grayscale images, and the block containing the calibration board is selected, so the range of 3 regions of interest (ROI) can be obtained. Secondly, the computer system 140 uses specific convolution to process the region of interest (ROI), and performs dot product on the grayscale images in the region of interest (ROI), and then selects the 81 calibration points (i.e. the 81 points on the calibration board) on the highest pixel coordinates according to the threshold value. Next, neural network training on the region of interest (ROI) is performed, the single-layer 9-node neural network architecture is established, and the matrix parameters (i.e. the relationship between pixel coordinates and world coordinates) of the neural network training are output. Finally, the matrix parameters are input into the corresponding image processing software to complete the part of the image calibration.

Next, the relative displacement P between the position of the monitor group 210 and the reference point 230 is found. In some embodiments, for the above-mentioned real-time calculation, 6×6 cm black and white feature points are set in the region of interest (ROI), and the coordinates of the center point of the white block are automatically calculated, so the displacement period response of the of the reference point 230 can be obtained, and the relative displacement P between the position of the monitor group 210 and the reference point 230 can be obtained. The above-mentioned method can also refer to the specific description of the embodiment described in FIG. 4 below.

Then, the relative displacement P is converted into the relative displacement RD of the adjacent floor slabs in the horizontal direction through coordinate conversion. This conversion method is known to those with ordinary knowledge in the field, so it is not detailed here.

Next, the tracking reference points are compared, and the relative displacement vector between the position of the monitor group 210 and the reference point 230 is found. In this step, the computer system 140 measures the relative displacement vector P1_total between the position of the reference point 230 in the above-mentioned processed photo and the position of the reference point 230 in the initial image extracted by the monitor group 210.

Then, the interlayer relative displacement vector is calculated. In this embodiment, the computer system 140 performs calculations according to the above-mentioned relative displacement vector to obtain an interlayer relative displacement vector. In some embodiments, the computer system 140 subtracts the relative displacement vector P1_total from the rotation displacement vector P1_rotation generated by the rotation of the monitor group 210, so as to calculate the interlayer relative displacement vector P1_translation. The above-mentioned calculation procedure can be expressed as the following formula (A):

$$P_1\_translation = P_1\_total - P_1\_rotation \quad (A)$$

Then, the relative displacement ratio RDR of the adjacent floor slabs in the horizontal direction is calculated, and the degree of damage is identified accordingly. In this step, the computer system 140 divides the relative displacement RD of the adjacent floor slabs in the horizontal direction by the height of the building to obtain the relative displacement ratio RDR of the adjacent floor slabs in the horizontal direction.

Next, when the degree of damage is higher than a given threshold value, the notification is broadcasted to the relevant personnel. In other words, in one embodiment, the computer system 140 can control the warning system 150 to transmit the warning signal according to the interlayer relative displacement vector calculated by the above-mentioned computer system 140. In one embodiment, the threshold value can be used to represent the degree of damage when the building collapses or peels, but it is not limited to this. Any other threshold values that can be used to identify the condition of the building are within the protection scope of the present disclosure.

In terms of the above, in some embodiments, the frame extracted by the monitor group 210 consists of 1080 pixels. As mentioned earlier, the initial image is extracted when the earthquake is not occurred. When the content of the image extracted by the monitor during the subsequent period is different from the content of the initial image, that the earthquake has occurred is determined. For example, at time point t after the earthquake occurs, the monitor group 210 extracts the image It1. By observing the content of the image It1 and the initial image, that the reference point has shifted by a distance of 150 pixels is found. Since the rotation angle of the monitor group 210 can be different during an earthquake and the distance between the monitor group 210 and the reference point 230 is known, the interlayer relative displacement vector can be obtained through calculation. In this way, the relative displacement P between the monitor and the reference point can be found, and the relative displacement P can be converted into the relative displacement RD of the adjacent floor slabs in the horizontal direction through the coordinate conversion. With the above-mentioned information, if the height of the building is known, the relative displacement ratio RDR of the adjacent floor slabs can be calculated according to the height of the building, and the degree of damage can be identified accordingly.

When the earthquake occurs, in the condition that monitor is fixed on the floor or beam, column, or wall, the lens can have a slight rotation angle due to the fixed point or the monitor mechanism. However, even if the rotation angle is small, the above-mentioned displacement measurement performed under a certain distance can have the error, so the error cannot be ignored. Therefore, in some embodiments, the mechanism of the monitor group 210 in the present disclosure can be implemented with a rigid body structure. In this way, the rotation of the lens is entirely identified by the angle variable (e.g. the rotation effect corresponding to the monitor) of the fixed point of the camera. The above-mentioned displacement measured by the interlayer displacement method according to the reference point 230 minuses the displacement measurement error caused by the rotation effect, thereby obtaining the interlayer displacement result after the rotation effect is removed, so as to make the measurement result more accurate.

Figure 3:
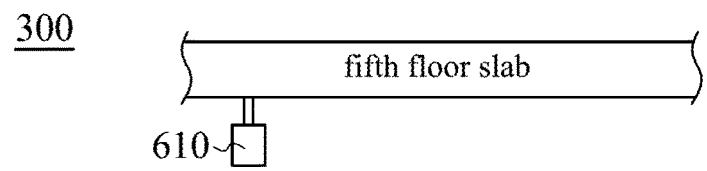
FIG. 3 is a configuration diagram of an earthquake monitoring system for the multi-slayer building earthquake according to some embodiments of the present disclosure.
Figure 3:
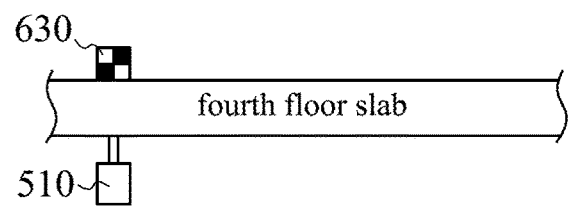
Figure 3:
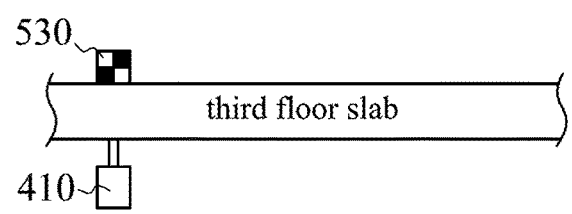
Figure 3:
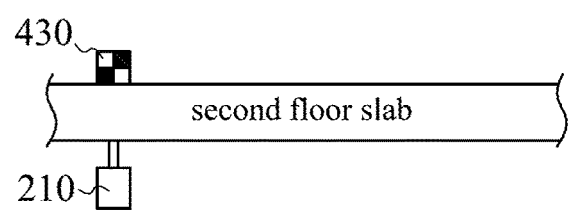
Figure 3:
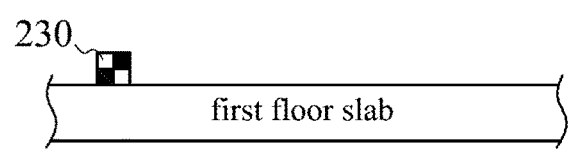

In other embodiments, the above-mentioned monitor system can be respectively disposed on each floor of a multi-slayer building. Referring to FIG. 3, FIG. 3 is a configuration diagram of an earthquake monitoring system 300 for the multi-slayer building earthquake according to some embodiments of the present disclosure. The earthquake monitoring system 300 for a multi-slayer building includes a monitor group 210, a reference point 230, a monitor group 410, a reference point 430, a monitor group 510, a reference point 530, a monitor group 610, and a reference point 630. The monitor group 210 is disposed under the second floor slab. The reference point 230 is disposed on the first floor slab. The monitor group 410 is disposed under the third floor slab. The reference point 430 is disposed above the second floor slab. The monitor group 510 is disposed under the fourth floor slab. The reference point 530 is disposed above the third floor slab. The monitor group 610 is disposed under the fifth floor slab. The reference point 630 is disposed above the fourth floor slab.

The monitoring method of the above-mentioned earthquake monitoring system 300 for the multi-slayer building is similar to the above-mentioned embodiment with the earthquake monitoring system 100 about FIGS. 2A-2C, so it will not be repeated here. By disposing the earthquake monitoring system between each floor slab, the intensity of the earthquake and the degree of damage of the building can be more accurately estimated. For example, when the reference point 230 on the first floor changes due to construction or other human factors, the monitoring results of other floors can be used to determine whether the earthquake occurs. In addition, although the first floor is usually the most severely damaged floor of the building, there is still the possibility of more serious damage to other floors due to different configurations of structural elements on each floor or unstable construction quality. Therefore, by disposing the earthquake monitoring system 300 for the multi-slayer building, the problem of inaccuracy of the monitoring results of the first floor due to unpredictable factors can be avoided, so as to ensure that the degree of damage can be reduced and the rescue human resources can be saved.

In addition to the above, in different embodiments, the above-mentioned method of removing the displacement measurement error caused by the rotation effect can be performed by using pure image processing. For example, by performing the processing method (hereinafter referred to as the 3ROI method) of three regions of interest (ROI) on the images extracted by the above-mentioned monitor group. In some embodiments, the above-mentioned 3ROI method includes sequential image finding and calibration, real-time calculation, fusion method, and damage assessment, which the specific details are as follows.

First, in some embodiments, for the above-mentioned image finding and calibration, three 9×9 checkerboard calibration boards are mainly disposed in the three blocks (e.g. one place (F) on the floor and two places on the ceiling (A, B)) to be tracked, and the training photos are photographed, and then the training photos are converted into grayscale images, and each block with the calibration board is selected, so three regions of interest (ROI) are obtained. In any region of interest (ROI), and the grayscale image in the region of interest (ROI) are performed the dot product by a specific convolution sum, and then the 81 calibration points (i.e. the 81 points on the calibration board) on the highest pixel coordinates are selected according to the threshold value. Next, each of the three regions of interest (ROI) is performed the neural network training to establish the single-layer 9-node neural network architecture, and the matrix parameters (i.e. the relationship between pixel coordinates and world coordinates) of the neural network training are output. Finally, the matrix parameters are input into the corresponding image processing software to complete the 3ROI image calibration part.

Secondly, in some embodiments, for the above-mentioned real-time calculations, the 3 regions of interest (ROI) are respectively set as 6×6 cm black and white feature points, and the coordinate of the center point of the white block is automatically calculated, so the displacement period response of the above-mentioned feature point (F) on the floor and the two feature points (A, B) of the ceiling is obtained. Next, the displacement period response of the two feature points (A, B) of the ceiling is used to conduct reversely the rotation matrix (R), and then calculate the displacement measurement error of the feature point (F) at the floor caused by the rotation effect, so the displacement measurement error of the feature point (F) at the floor caused by the rotation effect can be calculated. Finally, the displacement period response of the feature point (F) at the floor where the rotation effect is removed is obtained, which is the interlayer relative displacement period response. The above-mentioned technical details will be described with reference to the embodiment shown in FIG. 4 below.

Then, in some embodiments, for the above-mentioned damage assessment, the interlayer displacement signal obtained by the fusion method is divided by the floor height. In this way, the interlayer displacement ratio at any time can be obtained, and then the maximum value of the interlayer displacement ratio can be compared with the standard damage threshold value (e.g. the damage threshold value set in the earthquake model technical manual), so the degree of damage of the structure can be obtained for evaluation.

Figure 4:
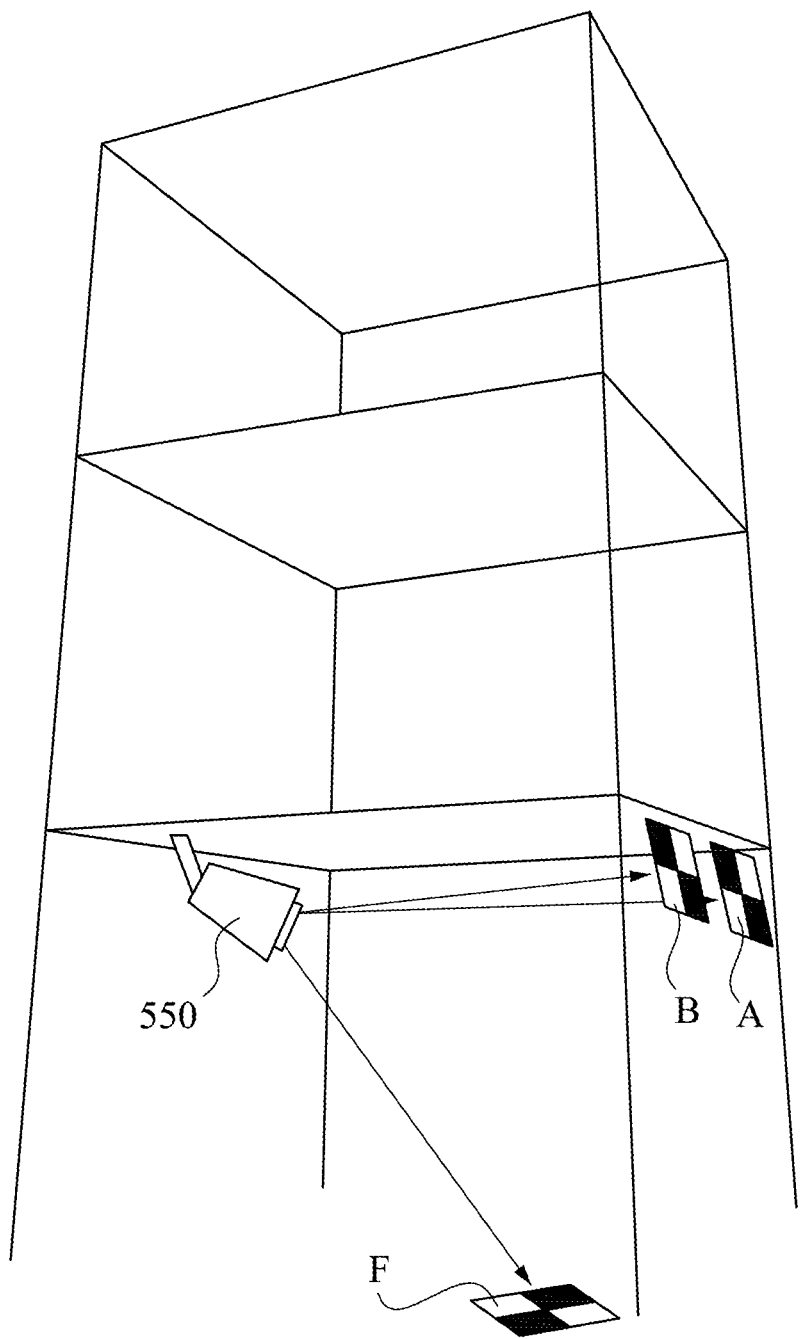
FIG. 4 is a schematic diagram showing the configuration of a monitor of the earthquake monitoring system in FIG. 1 according to different embodiments of the present disclosure.

FIG. 4 is a schematic diagram showing the configuration of a monitor of the earthquake monitoring system in FIG. 1 according to different embodiments of the present disclosure. Compared with FIG. 2A, in the embodiment of FIG. 4, the earthquake monitoring system includes single monitor group 550 and feature points F, A, B (or referred to as reference points), where the monitor group 550 is disposed on the ceiling, and the feature points F, A, and B are correspondingly configured with the monitor group 550. As shown in FIG. 4, the feature point F is disposed at one place on the floor, and the feature points A and B are s disposed at two places on the ceiling for the implementation of the above-mentioned ROI method. In some embodiments, each of the above-mentioned feature points F, A, and B is implemented with the configuration of the 9×9 checkerboard calibration board. In addition, the above-mentioned arrangement positions of the monitor group 550 and the feature points F, A, and B are only examples, and other suitable positions that can be used to implement the technology of the present disclosure are within the scope of the present disclosure.

In the procedure of image measurement, the spatial information of real structures is derived by analyzing the photographing results, and the calibration of photographic equipment is a relatively important link. In the embodiment shown in FIG. 4, the single monitor group 550 is configured to perform image photographing and image processing on a two-dimensional plane. To obtain the coordinates of the real world, it is necessary to calculate the position, size, shape and other spatial information of the object in the real world through information such as the relative position of the photographic equipment and the object being photographed. These parameters of relative position are referred to as "external parameters" in some embodiments, and the deformation caused by external parameters rather than lens factors during the procedure of the image processing can be referred to as "perspective deformation". The following will specifically explain how to calibrate the above-mentioned problems by processing the images obtained by the single monitor group 550.

In some embodiments of the present disclosure, the method of the neural network calibration training is mainly used to obtain the relationship between pixel coordinates and real coordinates. Compared with the traditional two-dimensional projection method through the coordinate conversion, the method of the neural network calibration training does not need to measure the relative spatial relationship which is the distance between the object and the lens, angle, etc., so there is no problem of measurement error.

In some embodiments, the above-mentioned the method of the neural network calibration training can be achieved by connecting the above-mentioned earthquake monitoring system to a desktop computer, a notebook computer, a mobile device, etc. and other devices with arithmetic processing functions, and through the above-mentioned device with arithmetic processing function, the method of the neural network calibration training is performed.

In some embodiments, the operation of performing the neural network calibration training includes at least two parts, where the first part is to obtain the spatial information of the calibration board in the image pixel coordinates, and the second part is to establish a neural network system to output the relationship parameters between the image pixel coordinates and the real world coordinates.

In some embodiments, regarding the above-mentioned first part, the monitor group 550 can be controlled by a notebook computer to photograph a picture of each of the calibration boards on the feature points F, A, and B, for example. In some embodiments, the bottom edge of the calibration board and the bottom edge of the frame in the extracted photo remain parallel.

Next, the grayscale images in the photos photographed are performed the operation of the dot product (As described in Yann LeCun, Koray Kavukcuoglu and Clement Farabet. "Convolutional Networks and Applications in Vision." 2010 IEEE related literature) by the convolution sum, and by the method of automatically adjusting the threshold value, the 81 points with the highest value are filtered out, which corresponds to 9×9 black and white calibration points on the black and white checkerboard calibration board. In some embodiments, if the grayscale value difference of adjacent pixels in the grayscale image is very small, the value calculated by the operation of dot product by the convolution sum will be small, and vice versa.

In some embodiments, it can be further determined whether the number of calibration points described above is correct. If the number of calibration points is not correct, it can go back to the previous step, and perform the operation of dot product by the convolution kernel on the grayscale image in the extracted photo again, and then filter out the corresponding calibration points again.

On the other hand, if the number of calibration points is correct, the coordinates of the calibration points at the boundary can be further used to identify an appropriate region of interest (ROI).

In some embodiments, it can further check whether the number of calibration points within the above-mentioned region of interest (ROI) is correct. Similarly, if the number of calibration points is incorrect, it can go back to the previous step and use the coordinates of the calibration points on the boundary to identify the appropriate region of interest (ROI). Conversely, if the number of calibration points in the region of interest (ROI) is correct, the coordinates of the calibration points in the image, parameters about the region of interest (ROI), etc. can be output.

After the above procedure of obtaining the spatial information of the calibration board in the image frame, the second part can be followed to establish the neural network system to output the relationship parameters between the image pixel coordinates and the real world coordinates. In some embodiments, the pixel coordinates of 81 calibration points on the black and white checkerboard calibration board in the photograph taken are first read, and the coordinate (0, 0) is regarded as the center, so the real world coordinate grid of calibration points, which are 9×9 unit from coordinate (+4, +4) to coordinate (−4, −4), is regarded as the reference answer for neural training. In some embodiments, the actual distance of each unit is the actual interval on the black and white chessboard on the selected calibration board, for example, the selected calibration interval is 1.85 cm.

Next, a neural network training architecture is established. In some embodiments, the single-layer 9-node neural architecture can be established in the system, and then the sigmoid function is used for neural network training, and the output result is the real world coordinates corresponding to the calibration points on the 81 pixel coordinates.

Then, the sum of the distance between the real world coordinates of the 81 calibration points and their corresponding reference answers (i.e. the calibration points which are 9×9 unit from (+4, +4) to (−4, −4) above) is regarded as the error to perform neural network training (e.g. nearly 1 million times training). When the error is close to stable, the training is stopped, and the conversion matrix parameters between the pixel coordinates and the real world coordinates are extracted.

Figure 5:
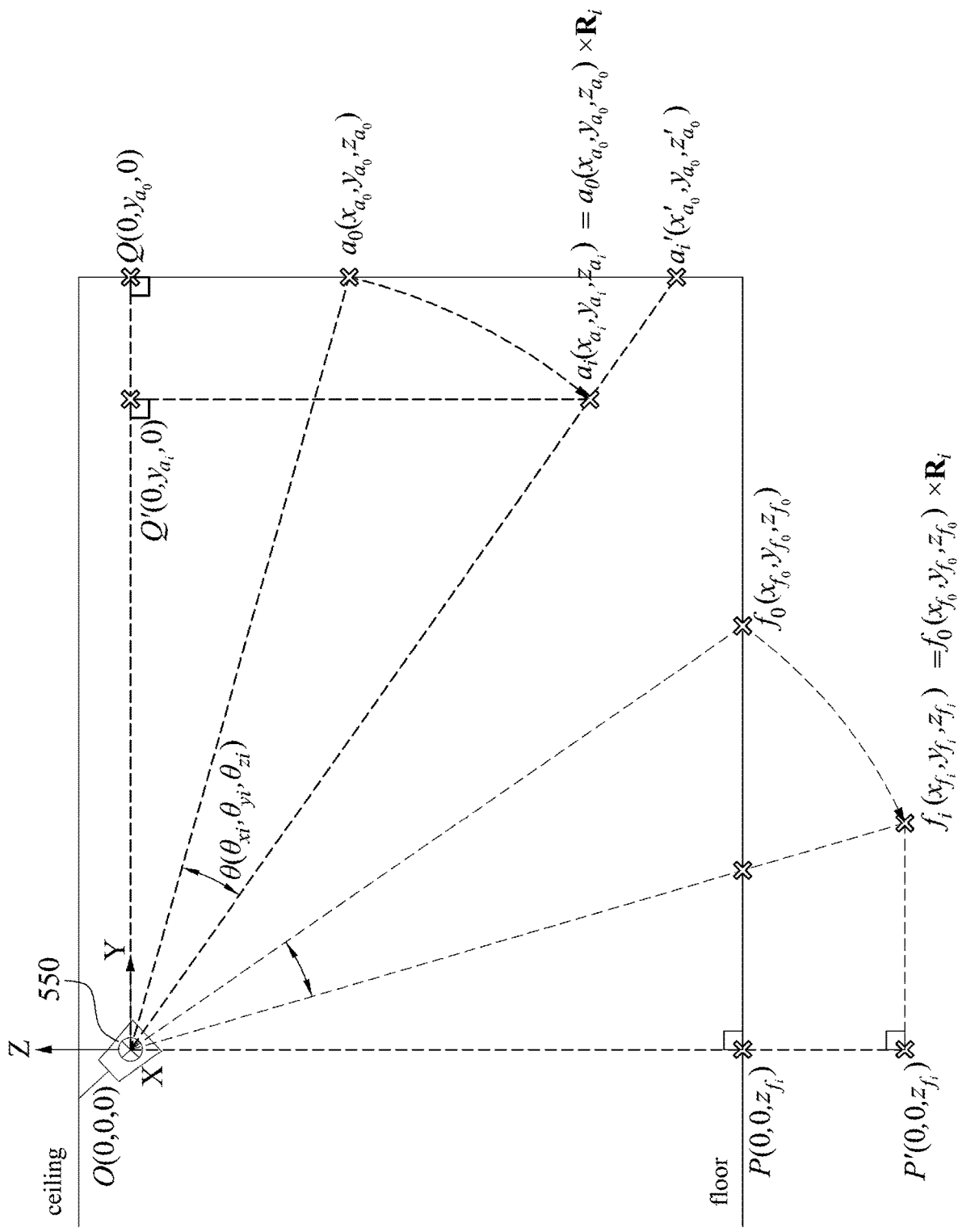
FIG. 5 is a schematic diagram of the geometric relationship between the monitor group and the reference point in the earthquake monitoring system shown in FIG. 4 according to some embodiments of the present disclosure.

FIG. 5 is a schematic diagram of the geometric relationship between the monitor group and the reference point in the earthquake monitoring system shown in FIG. 4 according to some embodiments of the present disclosure. In order to further explain the reference point displacement described in the embodiment shown in FIG. 4, the following description is combined with the embodiment shown in FIG. 5. As shown in FIG. 5, the monitor group 550 corresponds to the monitor group 550 in FIG. 4, the coordinate a0 corresponds to the reference point A in FIG. 4, and the coordinate b0 (not shown) corresponds to the reference point B in FIG. 4, where $$a_0(x_{a_0}, y_{a_0}, z_{a_0}), (b_0(x_{b_0}, y_{b_0}, z_{b_0}).$$

First, according to the initial position vectors of the reference points A and B, a virtual initial position vector of point C is calculated with the following formula (1).

$$c_0 = a_0 \times b_0 \tag{1}$$

Next, according to the geometric relationship shown in FIG. 5, at any time point i, the position vector of the reference point A is obtained by the following formulas (2) and (3), $$(\Delta x_{a_i}, \Delta z_{a_i}) = (x'_{a_i}, z'_{a_i}) - (x_{a_0}, z_{a_0}) = \frac{y_{a_0}}{y_{a_i}}(x_{a_i}, z_{a_i}) - (x_{a_0}, z_{a_0}) \tag{2}$$

$$x_{a_i}^2 + y_{a_i}^2 + z_{a_i}^2 = x_{a_0}^2 + y_{a_0}^2 + z_{a_0}^2 \tag{3}$$

Where $(\Delta x_{a_i}, \Delta z_{a_i})$ is the displacement at time point i calculated according to the change of reference point A, which is in the image. In the same way, the position vector of the reference point B can be calculated in a similar manner as described above, so it will not be repeated here.

Similarly, after the position vectors of the reference point A and the reference point B are obtained, the displacement vector of the virtual point C at the time point i can also be calculated by this formula.

Secondly, when the initial position vectors of reference points A and B and the position vectors of reference points A and B at time point i are known, the following formula (4) can be used to obtain the rotation matrix Ri at time point i.

$$[R_i]_{3\times 3} = \begin{bmatrix} x_{a_i} & x_{b_i} & x_{c_i} \\ y_{a_i} & y_{b_i} & y_{c_i} \\ z_{a_i} & z_{b_i} & z_{c_i} \end{bmatrix} \begin{bmatrix} x_{a_0} & x_{b_0} & x_{c_0} \\ y_{a_0} & y_{b_0} & y_{c_0} \\ z_{a_0} & z_{b_0} & z_{c_0} \end{bmatrix}^{-1} \tag{4}$$

Then, when the rotation matrix Ri is known, the following formula (5) can be further used to obtain the position of the reference point F at the time point i with the initial position of the reference point F, where $$\begin{bmatrix} x_{f_i} \\ y_{f_i} \\ z_{f_i} \end{bmatrix}_{3\times 1} = [R_i]_{3\times 3} \begin{bmatrix} x_{f_0} \\ y_{f_0} \\ z_{f_0} \end{bmatrix}_{3\times 1} \tag{5}$$

In some embodiments, the rotation displacement P1_rotation caused by the rotation of the monitor group 550 at the time point i can be obtained by the following formulas (6) and (7):

$$Vf_i^r(Vx_{f_i}^r, Vy_{f_i}^r) = (x'_{f_i}, y'_{f_i}) - (x_{f_0}, y_{f_0}) = \frac{z_{f_0}}{z_{f_i}}(x_{f_i}, y_{f_i}) - (x_{f_0}, y_{f_0}) \tag{6}$$

$$x_{f_i}^2 + y_{f_i}^2 + z_{f_i}^2 = x_{f_0}^2 + y_{f_0}^2 + z_{f_0}^2 \tag{7}$$

Where $Vf_i^r(Vx_{f_i}^r, Vy_{f_i}^r)$ is the rotation displacement P1_rotation of the reference point F at the time point i due to the rotation effect. Once the rotational displacement P1_rotation is known, the above formula (A) can be used to calculate the interlayer relative displacement vector P1_translation.

Since the present disclosure is mainly to remove the rotation effect by tracking the displacement response of two places on the ceiling, and at the same time track the displacement response of a certain place on the floor, a total of three feature points (feature points F, A, and B as shown in FIG. 4) need to be tracked in one screen (i.e. the above-mentioned calculation to remove the displacement measurement error caused by the rotation effect). That is, a total of 3 regions of interest (ROI) are required, so it is necessary to perform the first part and the second part of the above-mentioned neural network training calibration in 3 different regions of interest (ROI). After the final training is completed, three different sets of the ranges of regions of interest (ROI) (including size and location), three different sets of 81-point calibration coordinates, and three different sets of training matrix parameters can be obtained. In this way, general monitoring cameras can be used for image measurement, and the interlayer displacement measurement technology with the above key factors can improve the accuracy of image measurement and be used for rapid diagnosis of structural safety after earthquakes.

Through the above method, the technology of the present disclosure can use a monitor system disposed indoors, to measure the relative displacement ratio between the upper and lower floors and determine the degree of damage of the building, and can automatically compensate for the error of the relative displacement ratio measurement caused by the rotation of the monitor, to enable residents in the building to respond and evacuate faster when an earthquake occurs and allow the relevant personnel to go to places that need assistance more efficiently. In addition, the present disclosure can allow the relevant personnel to know the degree of damage of the building at the remote end and determine whether the building needs to be repaired to enhance the earthquake resistance of the building.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An earthquake monitoring system, comprising:
a first monitor configured to photograph at least one reference point disposed on a first floor slab of a building to generate a first initial image and a first image stream, wherein the first monitor is disposed on a second floor slab of the building; and
a computer system configured to process the first initial image and the first image stream to obtain a first interlayer relative displacement vector between the first floor and the second floor, and control a warning system to output a warning signal according to the first interlayer relative displacement vector, wherein
the first monitor is configured to photograph a first reference point and a second reference point between the floor slabs and a third reference point on a floor to generate a plurality of corresponding images,
the computer system is configured to convert the plurality of corresponding images into a plurality of grayscale graphics which are corresponded, and perform convolution and dot product operations on a plurality of regions of interest corresponding to the plurality of grayscale graphics to select a plurality of calibration points on a plurality of highest pixel coordinates, and perform neural network training on the plurality of regions of interest to generate a plurality of matrix parameters for the neural network training, and perform image calibration on the plurality of corresponding images according to the generated matrix parameters.

2. The earthquake monitoring system of claim 1, wherein the first initial image is a first reference image photographed when the first monitor is not affected by an earthquake, wherein the first image stream is a plurality of first photos continuously extracted by the first monitor during the earthquake.

3. The earthquake monitoring system of claim 2, wherein the computer system is configured to compare one of the plurality of first photos with the first initial image to identify a displacement of the reference point, and configured to obtain the first interlayer relative displacement vector based on the displacement of the reference point.

4. The earthquake monitoring system of claim 1, wherein the computer system is configured to calculate a relative displacement of the first monitor and the reference point according to the first interlayer relative displacement vector.

5. An earthquake monitoring method, comprising:
photographing, by a first monitor, at least one reference point disposed on a first floor slab of a building to generate a first initial image and a first image stream;
processing, by a computer system, the first initial image and the first image stream to obtain a first interlayer relative displacement vector between the first floor and a second floor; and
controlling a warning system to output a warning signal according to the first interlayer relative displacement vector, wherein further comprising:
photographing, by the first monitor, a first reference point and a second reference point between the floor slabs and a third reference point on a floor to generate a plurality of corresponding images; and
converting, by the computer system, the plurality of corresponding images into a plurality of grayscale graphics which are corresponded, and perform convolution and dot product operations on a plurality of regions of interest corresponding to the plurality of grayscale graphics to select a plurality of calibration points on a plurality of highest pixel coordinates, and perform neural network training on the plurality of regions of interest to generate a plurality of matrix parameters for the neural network training, and perform image calibration on the plurality of corresponding images according to the generated matrix parameters.

6. The earthquake monitoring method of claim 5, wherein the step of processing the first initial image comprises:
obtaining a relative displacement vector between a position of the at least one reference point in the first initial image and a position of the at least one reference point in the first initial image which has been calbriated according to the generated matrix parameters; and subtracting the relative displacement vector from a rotation displacement vector generated by rotating the first monitor to obtain the first interlayer relative displacement vector.

7. The earthquake monitoring method of claim 5, further comprising:
calculating the relative displacement of the first monitor and the reference point according to the first interlayer relative displacement vector; and
controlling the warning system to output the warning signal according to the relative displacement.

8. A computer system for earthquake monitoring, comprising:
an image collector configured to receive a first initial image and a first image stream from a first monitor, wherein the first monitor is disposed on a second floor slab of a building and photographs at least one reference point disposed on a first floor slab of the building to generate the first initial image and the first image stream; and
a computing module connected to the image collector and an output module, and configured to process the first initial image and the first image stream to obtain a first interlayer relative displacement vector between the first floor slab and the second floor slab, and control, by the output module, a warning system to output a warning signal according to the first interlayer relative displacement vector,
wherein a first reference point and a second reference point between the floor slabs and a third reference point on a floor are photographed by the first monitor to generate a plurality of corresponding images, and the computing module is further configured to:
convert the plurality of corresponding images into a plurality of grayscale graphics which are corresponded;
perform convolution and dot product operations on a plurality of regions of interest corresponding to the plurality of grayscale graphics to select a plurality of calibration points on a plurality of highest pixel coordinates;
perform neural network training on the plurality of regions of interest to generate a plurality of matrix parameters for the neural network training; and
perform image calibration on the plurality of corresponding images according to the generated matrix parameters.

9. The computer system of claim 8, wherein the first initial image is a first reference image photographed when the first monitor is not affected by an earthquake, wherein the first image stream is a plurality of first photos continuously extracted by the first monitor during the earthquake.

10. The computer system of claim 9, wherein the computing module is configured to compare one of the plurality of first photos with the first initial image to identify a displacement of the reference point, and configured to obtain the first interlayer relative displacement vector based on the displacement of the reference point.

11. The computer system of claim 8, wherein the computing module is configured to calculate a relative displacement of the first monitor and the reference point according to the first interlayer relative displacement vector.

12. The computer system of claim 8, wherein the computing module is further configured to:
obtain a relative displacement vector between a position of the at least one reference point in the first initial image and a position of the at least one reference point in the first initial image which has been calbriated according to the generated matrix parameters; and
subtract the relative displacement vector from a rotation displacement vector generated by rotating the first monitor to obtain the first interlayer relative displacement vector.

13. The computer system of claim 8, wherein the computing module is further configured to:
calculate the relative displacement of the first monitor and the reference point according to the first interlayer relative displacement vector; and
control the warning system to output the warning signal according to the relative displacement.

* * * * *